United States Patent [19]

DeSantis

[11] 4,411,848

[45] Oct. 25, 1983

[54] METHOD FOR COMPACTING ARTICLES MADE OF POWDER MATERIAL AT A PREDETERMINED DENSITY

[75] Inventor: Raymond P. DeSantis, Troy, Mich.

[73] Assignee: PTX-Pentronix, Inc., Lincoln Park, Mich.

[21] Appl. No.: 319,246

[22] Filed: Nov. 9, 1981

Related U.S. Application Data

[62] Division of Ser. No. 269,512, May 28, 1981, Pat. No. 4,362,483.

[51] Int. Cl.[3] .............. B29F 3/04

[52] U.S. Cl. .............. 264/40.5; 264/109; 425/412

[58] Field of Search .............. 264/109, 405; 425/412

[56] References Cited

U.S. PATENT DOCUMENTS

| | | | |
|---|---|---|---|
| 2,509,783 | 5/1950 | Richardson | 78/0.5 |
| 2,821,748 | 2/1958 | Willi | 425/78 |
| 3,191,232 | 6/1965 | Haller | 425/78 |
| 3,328,840 | 7/1967 | Vinson | 425/78 |
| 3,328,842 | 7/1967 | Vinson | 425/78 |
| 3,415,142 | 12/1968 | Vinson | 425/78 |
| 3,524,220 | 8/1970 | Davison | 425/78 |
| 3,561,056 | 2/1971 | Smith et al. | 425/78 |
| 3,897,531 | 7/1975 | Overhoff et al. | 264/109 |
| 4,000,231 | 12/1976 | Peterson | 264/109 |

*Primary Examiner*—Lorenzo B. Hayes
*Attorney, Agent, or Firm*—Hauke & Patalidis

[57] ABSTRACT

A method for compacting articles made of powder material at a constant density, or at a density within a range. An example of apparatus for practicing the method of the invention takes the form of a hydraulic piston-cylinder assembly, defining a chamber which is filled with an uncompressible hydraulic fluid, disposed in the coupling between the actuating member of a mechanical press ram and the ram. The hydraulic fluid is pressurized by a compressed compressible fluid, such as air, acting on a large area piston directly coupled to a small area piston disposed in a small diameter cylinder filled with the uncompressible hydraulic fluid and in communication with the chamber, the ratio in the areas of the pistons determining the pressure amplification rate or gain. When the press ram meets a resistance to its travel which is large enough to overcome the pressure of the hydraulic fluid in the chamber, the volume of the chamber is decreased with the result that hydraulic fluid is introduced in the small diameter cylinder, thus displacing the small area and the large area pistons against the pressure of the compressible fluid, cushioning the impacts and shocks to which the ram is subjected in operation, and effecting compaction at constant pressure, or at a pressure within a range.

21 Claims, 3 Drawing Figures

METHOD FOR COMPACTING ARTICLES MADE OF POWDER MATERIAL AT A PREDETERMINED DENSITY

CROSS-REFERENCE TO RELATED APPLICATION

This application is a division of application Ser. No. 269,512, filed on May 28, 1981, now U.S. Pat. No. 4,362,483 for Hydraulic Shock Absorbing Mechanism for the Ram of Powder Compacting Presses and the Like, assigned to the same assignee as the present application.

BACKGROUND OF THE INVENTION

In precision press operations, more particularly when articles compacted of powder material are subject to tight tolerances and high precision, in the dimensions as well as in the density of the compacted articles, it is advantageous to provide some mechanism for maintaining a constant press force for each stroke of the press, and for cushioning the impact shocks. Various types of deflection compensation systems and impact shock cushioning devices have been proposed in the past, such as disclosed in U.S. Letters Patent No. 3,733,154, assigned to the same assignee as the present application, which discloses an impact shock or absorbing system forming part of the press ram itself. Deflection compensation and shock absorbing mechanisms may also be incorporated into the die and punch assembly, as disclosed, for example, in U.S. Letters Patent No. 3,669,582, also assigned to the same assignee as the present application.

In addition, it is often desirable to effectuate a pressing operation at a predetermined ram pressure or at ram pressure within a predetermined range. Such a requirement is difficult to achieve in a mechanical powder compacting press because of the variations that may occur in the volume of powder material used in consecutively filling the die cavity. There is a requirement in some powder material compacting operations for obtaining articles of a predetermined constant density from article to article, while the height or thickness of the article may be allowed to vary from article to article within a relatively wide range. Examples of such articles wherein constant density is the predominant characteristic, rather than dimensions, are nuclear fuel pellets used to charge reactor rods. The rods are tubular and relatively slender, and they are of substantial length. The principal requirements are that all the pellets be of the same diameter and the same density. The diameter of the pellets correspond to the internal diameter of the rods, and any variation in thickness of the pellets is compensated for, in view of the length of the rods, by loading each rod with the number of pellets required to fill the rod.

SUMMARY OF THE INVENTION

The method of the present invention permits to compact powder material into articles of constant density, by means of a ram pressure adjusting mechanism which, in addition, acts as an impact cushioning and shock absorbing mechanism, which requires no modification of the powder compacting press to the ram or to the punch and die assembly used for forming powder compacting articles. By providing a pressure adjusting mechanism forming part of the coupling member between the ram of the press and the actuating member for reciprocating the ram, the invention may thus be practiced as a result of retrofitting already existing mechanical presses presently in operation.

The diverse objects and advantages of the present invention will become apparent to those skilled in the art when the following description of the best mode contemplated for practicing the invention is read in conjunction with the accompanying drawing wherein:

DETAILED DESCRIPTION OF THE PREFERRED EMBODIMENT

Figure 1:
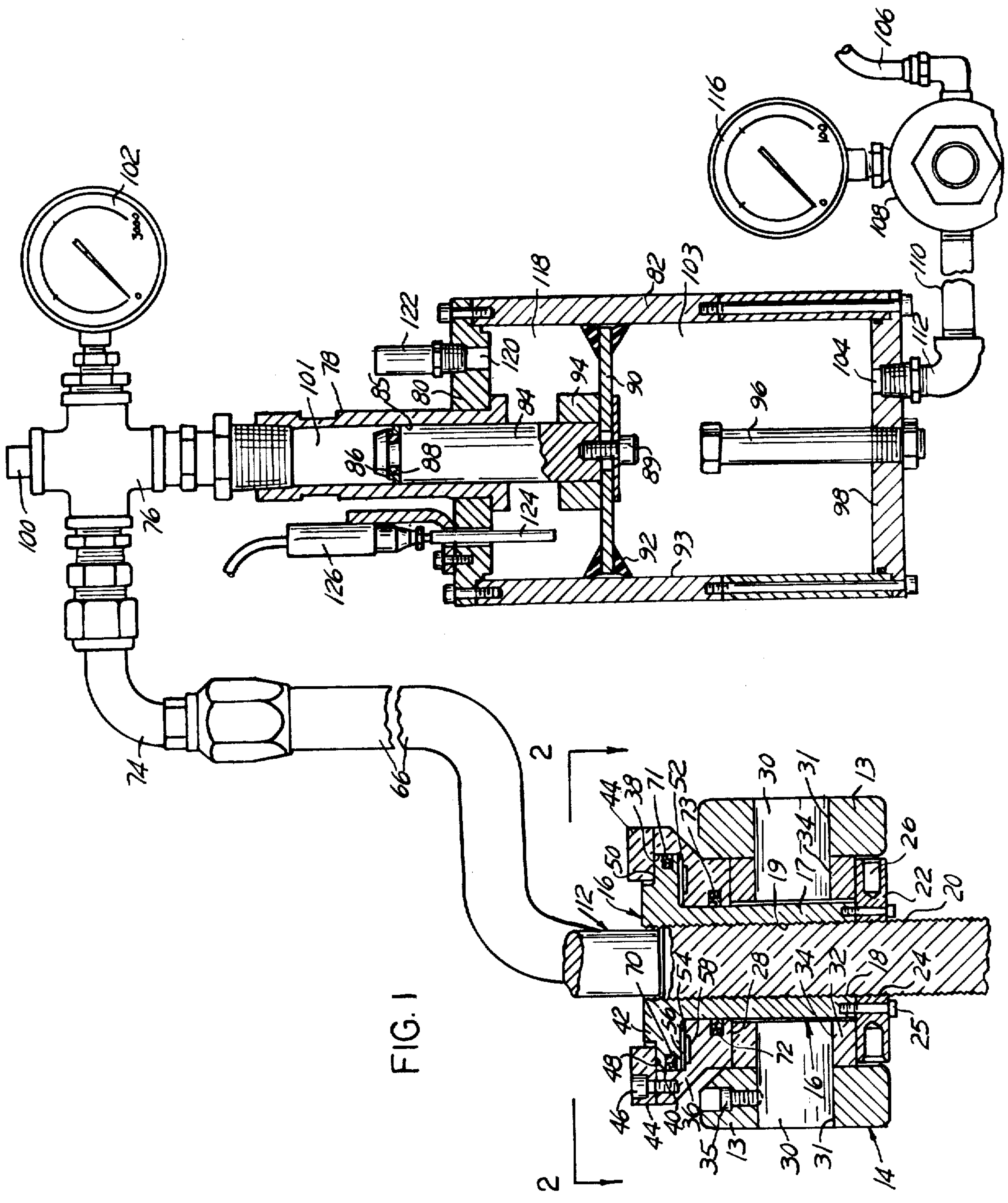
FIG. 1 illustrates, with some portions omitted and others broken away, an example of structure for practicing the method of the present invention by means of a mechanically actuated press ram such as the treadle-actuated ram of a powder compacting press.
Figure 2:
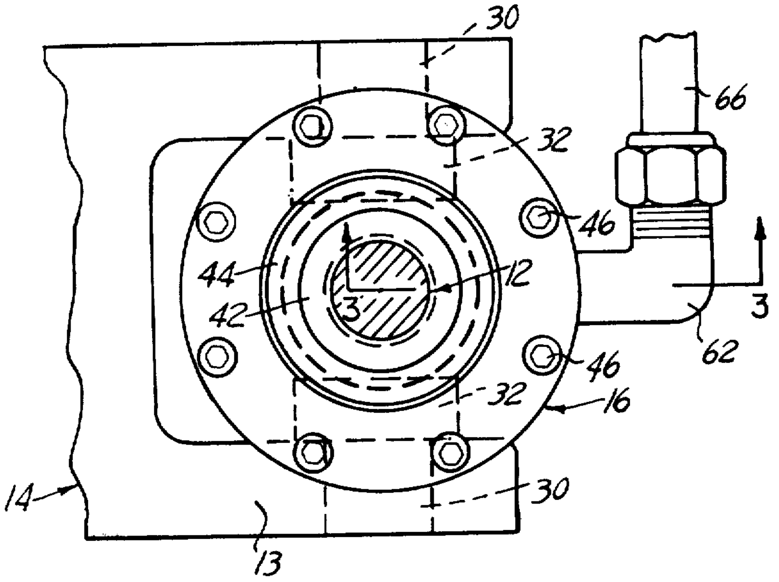
FIG. 2 is a partial top plan view from line 2—2 of FIG. 1.

In U.S. Letters Patent Nos. 3,328,840, 3,328,842, 3,415,142, 3,561,056 and 3,741,697, for example, there are disclosed powder compacting presses having a ram, such as ram 12 as illustrated in the drawing, reciprocated as a result of being driven by the bifurcated end 13 of a rocker arm or treadle 14 through the intermediary of a spool 16. The ram 12 is supported for reciprocation below the table of the press, not shown, and punch holding means are mounted on the end of the ram 12 for reciprocating the punch or punches of a punch and die assembly mounted in an aperture in the table. The powder material placed in the die cavity above the punch is compacted in the die cavity between the end face of the punch and a die cavity closure wall which may take the form of the face of an anvil clamped over the die cavity or, in the alternative, the face of a counterpunch, not shown, introduced in the die cavity from above, as is well known in the art of powder compacting presses.

The spool 16 has a body 17 having a longitudinal bore 18 provided with an internal thread 19 engaging a corresponding peripheral threaded portion 20 of the ram 12. The spool 16 has a lower radially extending flange formed by a disk-like plate 22, also provided with an internally threaded bore 24 mounted on the lower end of the spool body 17, appropriate screws or bolts 25 fastening the disk-plate 22 to the end of the spool body 17. Radial bores are disposed in the flange plate 22, as shown at 26 at FIG. 1, such that by means of a spanner or a rod introduced through a bore 26, the flange plate 22 and the spool body 17 are rotated in unison to adjust the relative position of the spool 16 along the longitudinal axis of the ram 12. As is well known in the art, the upper limit of the adjustment of the spool 16 along the longitudinal axis of the ram 12 determine the press dwell position of the compacting punches.

The force of compaction is transmitted through the ram 12 to the article to be compacted by the oscillating bifurcated end 13 of the treadle 14 via an upper annular abutment 28 of the spool 16. In prior art structures as disclosed in the aforesaid patents, the annular abutment 28 is on a flange which is an integral part of the spool 16, and the force of compaction is transmitted to the spool 16 through the intermediary of a pair of pins 30 mounted in aligned bores 31 in the bifurcated end 13 of the treadle 14 and of a pair of substantially rectangular pillar blocks 32, each having a central bore 34 through which is disposed the end of each pin 30. Set screws, such as set screws 35, hold each pin 30 fast in each bore 31.

Figure 3:
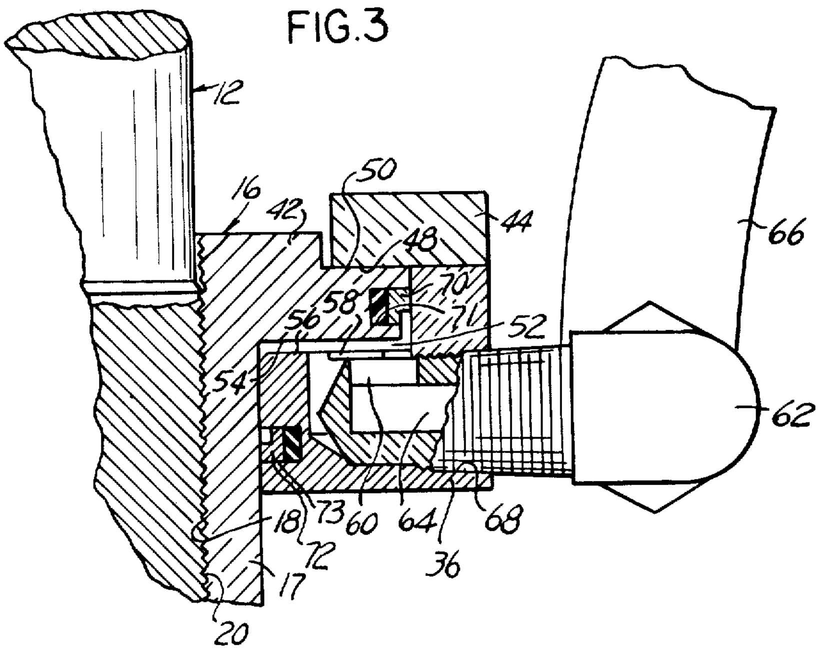
FIG. 3 is a partial sectional view from line 3—3 of FIG. 2.

In the structure illustrated in the drawing however, the annular abutment surface 28 is formed at the bottom of a ring or sleeve 36 slidably disposed around the periphery of the body 17 of the spool 16. The sleeve 36 has an enlarged diameter bore 38 slidably accepting the edge portion 40 of a flange 42 integrally formed on the end of the spool body 17. The permissible displacement of the sleeve 36 relative to the flange 42 of the spool body 17 is limited in one direction by a ring 44, fastened to the top of the sleeve 36 by means such as bolts or screws 46, as a result of the engagement of an annular abutment surface 48 on the ring 44 with a corresponding annular abutment surface 50 on the top of the spool flange 42. When the two annular surfaces 48 and 50 abut, a variable volume changer in the form of an annular chamber 52 is formed between the lower annular surface 54 of the spool flange 42 and an annular surface 56 disposed at the bottom of the enlarged diameter bore 38 in the sleeve 36. The annular chamber 52 is placed in fluid communication, by means of an annular groove 58 formed in the annular surface 56 with a passageway 60, FIG. 3, transversely disposed at the end of a fitting 62 and leading into a channel 64 in the fitting 62 mounted on the end of a flexible hose 66. The fitting 62 is fitted into a radial threaded aperture 68 in the sleeve 36. Seals in the form of annular rings 70 and 72 are disposed in appropriate grooves 71 and 73 respectively in the edge 40 of the spool flange 42 and in the inner surface of the sleeve 36 engaged with the peripheral surface of the spool body 17 to prevent flow of fluid from the annular chamber 52, except through the fitting 62 and hose 66, when the volume of the annular chamber 52 is reduced as a result of the sleeve 36 being displaced relative to the spool flange 42 in the direction that disengages the annular abutment surfaces 48 and 50 from each other.

The flexible hose 66 is connected through an elbow 74, FIG. 1, and a T-connector 76, for example, to a relatively small bore cylinder 78 fastened in the end wall 80 of a much larger bore cylinder 82. A piston rod 84 is mounted reciprocable in the bore 85 of the cylinder 78, the end of the piston rod 84 being provided with an appropriate sealing ring 86 fitted in a receiving groove 88. The other end of the piston rod 84 is fastened, such as by a bolt 89, to a relatively large piston 90, provided with peripheral elastomeric piston cup 92, disposed reciprocable in the relatively large bore 93 of cylinder 82. The upward displacement of the piston 90 is limited by a ring 94 disposed around the piston rod 84 at its junction with the piston 90, and the permissible travel of the piston 90, in a downward direction, is limited by an axially fastened stud or bolt 96 projecting in the interior of the cylinder 82 from the other end wall 98 of the cylinder.

The T-connector 76, which is the highest point of the system, is provided with a plug 100 closing the top of the T-connector such that, after removal of the plug 100, the chamber 101 defined in the bore 85 of the cylinder 78 above the end of the piston rod 84 and the whole system including the annular chamber 52, and the flexible hose 66, may be filled with an uncompressible hydraulic fluid such as oil. The pressure of the hydraulic fluid in the system is visually displayed by a pressure gauge 102.

Compressed air may be introduced into a chamber 103 in the bore 93 of the cylinder 82 below the piston 90 through a port 104 in the cylinder end wall 98. Compressed air is obtained from an air compressor or other compressed air source, not shown, through a line 106, a pressure regulator 108 and a line 110 connected to a fitting 112 providing air to the chamber 103 through the port 104. A pressure gauge 116 displays the pressure of the air being supplied to the chamber 103, as adjusted by means of the regulator 108. In view of the difference in areas between the piston 90 and the piston rod 84, the assembly of the piston 90 and piston rod 84 displaceable in the cylinder 82 and the cylinder 78 acts as a pressure amplifier between the air contained in the chamber 103 and the oil contained in the chamber 101 above the piston rod 84, the gain or amplification factor of the pressure amplifier being proportional to the ratio of the surface area of the piston 90 to the surface area of the piston formed at the end of the rod 84. Atmospheric air present in the chamber 118 formed on the top of the piston 90 between the piston and the end wall 80 of the cylinder 82 is exhausted to the ambient through a port 120 provided with a muffler 122. In the event of complete loss of pressure of the fluid in the hydraulic fluid portion of the system, the piston 90 is caused by the air pressure in the chamber 103 to be displaced upwardly until the upper surface of the piston engages the end of a plunger 124 tripping a safety electric limit switch 126 from "on" to "off". The limit switch 126, when turned off, in turn turns off the relay of the press motor, such as to immediately stop the operation of the press.

In operation, compressed air at a predetermined pressure is supplied to the chamber 103 in the bore 93 of the cylinder 82 below the piston 90. The uncompressible hydraulic fluid, such as oil, filling the annular chamber 52 holds apart the annular surface 56 of the sleeve 36 and the annular surface 54 of the spool flange 42, the annular surfaces 48 and 50 being in engagement with each other as illustrated in the drawing. At the end of a compaction cycle, that is at the end of the upper stroke of the ram 12 as actuated by the treadle 14 through the sleeve 36, if the pressure applied to the article being compacted exceeds the force exerted on the spool 16 by the pressure of the oil in the annular chamber 52, oil is expelled from the annular chamber 52, thus displacing the piston rod 84 downwardly against the air pressure in the chamber 103 below the piston 90. The system, therefore, acts as a cushion which dampens mechanical shocks, and by correct adjustment of the pressure of the compressible fluid, such as compressed air, in the system the pressure exerted by the punches on the article being compacted may be precisely determined as a function of the pressure in the system, rather than as a function of the dwell position of mechanical parts having solid surfaces in engagement.

A particular advantage of the invention which will be readily apparent to those skilled in the art is that the invention permits to effectuate compaction of articles repetitively at a constant predetermined ram pressure. For that purpose, the chamber 103 in the bore 93 of the cylinder 82 below the piston 90 is filled with compressed air at a predetermined pressure, as controlled by the setting of the pressure regulator 108. The regulator 108 is set such as to maintain the pressure in the chamber 103 constant, with the result that the pressure of the hydraulic fluid in the chamber 101 above the piston rod 84 and in the variable volume annular chamber 52 is maintained at a constant value. The stroke of the ram 12 is adjusted such that when the ram 12 dwells at the end of its compacting stroke the annular flange 42 of the spool 16 is caused to be displaced relatively to the sleeve 36 from the position illustrated at FIG. 1 to any intermediary position short of causing engagement of the annular surface 54 with the annular surface 56. This in turn causes a reduction of the volume of the variable volume annular chamber 52, thus pumping a portion of the incompressible hydraulic fluid contained in the chamber 52 into the high pressure hydraulic system. As the pressure of the hydraulic system remains constant, pressing of the compacted article is effected at constant pressure.

If it is desired to compact articles at a pressure within a predetermined range, the air pressure regulator 108 is adjusted such that after compressed air at a predetermined pressure has been introduced in the chamber 103, backflow of compressed air through the pressure regulator is prevented even though the pressure of the air in the chamber 103 may have been increased. Under those conditions when, during dwell of the ram 12 at the end of its pressing stroke, the volume of the annular chamber 52 is momentarily decreased, the downward displacement of the piston 90 in the cylinder 82 causes an increase of pressure of the compressed air in the chamber 103 below the piston, and consequently an increase of the pressure in the high pressure hydraulic portion of the system.

If the resisting force to which the ram 12 is subjected exceeds the force provided by the pressurized fluid contained in the annular chamber 52, the spool annular flange 42 is caused to be displaced relative to the sleeve 36, until the annular surfaces 54 and 56 engage each other. Under those conditions, the ram function is exactly the same as it would be, except for a slight lost motion, in a mechanical press without the benefit of the improvement of the invention.

It will be appreciated by those skilled in the art that structures other than the one described hereinbefore in detail may be used for providing a variable volume chamber interposed between a press ram and the ram actuating mechanism, such as a chamber having deformable end diaphragms or a chamber in the form of an expandable bag, for example.

It will be further appreciated by those skilled in the art that the structure herein disclosed is well adapted to practicing the method of the invention of compacting articles, or workpieces, of powder material at a constant pressure or at pressures within a predetermined range, with the result thast the compacted articles have a constant density or a density within a predetermined range of densities from an article to the next in a production run.

Having thus described the invention by way of an example of structure particularly adapted to practice the method of the invention, modifications whereof will be apparent to those skilled in the art, what is claimed as new is as follows:

1. A method for compacting powder material into an article of a predetermined density in a powder compacting apparatus having a reciprocable ram supporting a punch for compacting said powder material in a die cavity against a die cavity closure wall, and means for reciprocating said ram, said method comprising coupling said means reciprocating said ram to the ram by way of a variable volume chamber whose volume varies between a maximum and a minimum, introducing a pressurized fluid in said variable volume chamber such as to expand said chamber to its maximum volume, adjusting the pressure of said pressurized fluid at a predetermined value, adjusting the stroke of said ram such that compacting of said article by said punch in said die cavity at maximum stroke of said ram causes said variable volume chamber to be contracted by the force of compaction to a volume intermediary between its maximum and minimum volumes, and compacting said article by reciprocation of said punch-supporting ram by said reciprocating means while maintaining said variable volume chamber at said volume intermediary between its maximum volume and its minimum volume.

2. The method of claim 1 wherein said predetermined pressure is a constant pressure.

3. The method of claim 1 wherein said predetermined pressure is maintained within a predetermined range.

4. The method of claim 1 wherein said fluid is an uncompressible fluid and further comprising placing said uncompressible fluid in communication with a compressible fluid, and maintaining said compressible fluid at said predetermined pressure.

5. The method of claim 4 wherein the pressure of said compressible fluid is maintained substantially constant.

6. The method of claim 4 wherein the pressure of said compressible fluid is maintained within a predetermined range.

7. The method of claim 4 wherein said compressible fluid transmits its pressure to said uncompressible fluid through pressure amplification means.

8. A method for compacting powder material into an article of predetermined density in an apparatus having a punch actuated by a reciprocable ram for compacting said powder material by said punch in a die cavity against a die cavity closure wall, and means for reciprocating said ram, said method comprising adjusting the maximum amount of travel of said reciprocable ram to a predetermined value, adjusting the distance of travel of said means reciprocating said ram to a second predetermined value greater than said predetermined value, coupling said means reciprocating to the ram through a piston-cylinder assembly having a length variable between a maximum length and a minimum length, introducing a fluid at a predetermined pressure in said piston-cylinder assembly, and compacting said article by reciprocation of said punch-supporting ram by said reciprocating means while maintaining said piston-cylinder assembly at a length intermediary between said maximum length and said minimum length, whereby compaction of said article is effected at a pressure which is a function of the pressure of the fluid in said piston-cylinder assembly.

9. The method of claim 8 wherein said predetermined pressure is a substantially constant pressure.

10. The method of claim 8 wherein said predetermined pressure is maintained within a range.

11. The method of claim 8 wherein said fluid is an uncompressible fluid and further comprising placing said uncompressible fluid in communication with a compressible fluid, and maintaining said compressible fluid at said predetermined pressure.

12. The method of claim 11 wherein the pressure of said compressible fluid is maintained substantially constant.

13. The method of claim 11 wherein the pressure of said compressible fluid is maintained within a predetermined range.

14. The method of claim 11 wherein said compressible fluid transmits its pressure to said uncompressible fluid through pressure amplification means.

15. A method for compacting powder material into an article of a predetermined density in a mechanical powder compacting apparatus having a punch actuated by a reciprocable ram for compacting said powder material in a die cavity against a die cavity closure wall and means for reciprocating said ram, said method comprising coupling said means reciprocating said ram to the ram by fluid pressure means, introducing a pressurized fluid in said fluid pressure means, adjusting the pressure of said pressurized fluid at a predetermined value, and adjusting the stroke of said ram such that the force of compacting of said article by said punch at maximum stroke of said ram is effected at the pressure of said pressurized fluid.

16. The method of claim 15 wherein said predetermined pressure is a constant pressure.

17. The method of claim 15 wherein said predetermined pressure is maintained within a predetermined range.

18. The method of claim 15 wherein said fluid is an uncompressible fluid and further comprising placing said uncompressible fluid in communication with a compressible fluid, and maintaining said compressible fluid at said predetermined pressure.

19. The method of claim 18 wherein the pressure of said compressible fluid is maintained substantially constant.

20. The method of claim 18 wherein the pressure of said compressible fluid is maintained within a predetermined range.

21. The method of claim 18 wherein said compressible fluid transmits its pressure to said uncompressible fluid through pressure amplification means.

* * * * *